Patented May 11, 1948

2,441,297

UNITED STATES PATENT OFFICE 2,441,297

PROCESS FOR DEHYDROGENATION OF HYDROCARBONS BY CONTACT WITH CATALYSTS SUPPORTED ON ALUMINA STABILIZED BY ALUMINUM PHOSPHATE

Robert I. Stirton, Redondo Beach, Calif., assignor to Union Oil Company of California, Los Angeles, Calif., a corporation of California No Drawing. Application May 3, 1944, Serial No. 533,949

9 Claims. (Cl. 260—668)

This invention relates to catalysts and catalytic processes for the processing of various hydrocarbons and/or hydrocarbon mixtures. The invention also relates to a method for preparing the catalysts.

More particularly, the invention relates to the catalytic treatment of hydrocarbon stocks, such as catalytic dehydrogenation of light or normally gaseous hydrocarbons, such as propane, propene, butane, butene, isobutane, and the like, and the catalytic dehydrogenation of normally liquid hydrocarbons, such as pentane, pentene, isopentane, isopentene, hexane, hexene, and the like, and catalytic reforming or aromatization of commercial naphthas and stocks boiling within the gasoline range to produce improved motor fuels and also to produce aromatic hydrocarbons such as benzene, toluene, xylenes, naphthalene and substituted naphthalenes and the like. The invention further relates to the catalytic desulfurization of petroleum fractions and/or combinations of said fractions, such as pressure distillate and even crude oils.

The principal objects of the invention are to provide a catalyst which is comparatively easy to produce, is not easily poisoned, has a long catalytic life, is heat stable, and the particles of which are capable of retaining their mechanical strength during use and which at the same time causes high conversions to the desired products, which products are determined by the nature of the feed stocks employed and the particular conditions of processing to which these feed stocks are subjected.

A more specific object of the invention is to provide a catalyst carrier or support containing a material which improves the stability of catalysts employing this carrier. A further object of the invention is to provide a catalyst carrier of such composition that the catalyst particles originally possess adequate mechanical strength and that the catalyst retains its mechanical strength during use. Another object of the invention is to provide a catalyst carrier containing a material which improves the activity of catalyst compositions employing said carrier.

Other objects, features and advantages of the invention will become apparent to those skilled in the art as the description thereof proceeds.

The catalytic treatment of hydrocarbons has come to involve many varied and unrelated processes which for purposes of this disclosure are divided into two groups. Catalytic conversion of hydrocarbons is considered to include aromatization, cracking, dehydrogenation, reforming of hydrocarbons, and any such process whereby a certain degree of destruction of the hydrocarbon materials is accomplished while catalytic hydrogenating is intended to include desulfurization, hydrogenation and any such process consisting of replacement of or addition to the hydrocarbon molecule. These two groups, namely, catalytic conversion and catalytic hydrogenating of hydrocarbons are both included in the broad concept of catalytic treatment and will be used hereinafter to distinguish the two classes of reactions.

For the convension and hydrogenating of hydrocarbons many catalytic agents have been employed with varying degrees of success. Such catalytic agents include the oxides or other compounds of metals, such as chromium, molybdenum, cobalt, nickel, zinc, iron, lead, beryllium, cadmium, vanadium, manganese, tantalum, tungsten, titanium, platinum, columbium, scandium, thorium, aluminum, uranium, zirconium, tin, copper, etc., or combinations of two or more of such compounds. Many of these catalytic agents are effective only when supported on carriers, such as the oxides of alumina, magnesium, silicon, zirconium, titanium, thorium, etc. The oxides of chromium and molybdenum distended on alumina are preferred catalysts for the above defined conversion processes.

For example, in a process generally described as dehydrogenation, a catalyst composed of 5% chromium oxide and 95% alumina which has been activated is capable of effecting as much as about 28% conversion of normal butane to butenes at a temperature of about 1050° F., at substantially atmospheric pressure and with a space velocity of from 15 to 17 volumes of feed per volume of catalyst per minute. Also, in aromatization operations a typical commercially prepared catalyst consisting of about 10% molybdenum oxide and 90% alumina which has been activated is capable of increasing the aromatic content of a naphtha boiling in the range of about 200 to 250° F. from about 14% to about 60% by volume at a temperature of about 950° F. at a liquid hourly space velocity of about 1, and gauge pressure of about 100 pounds per square inch with 3000 cubic feet of added hydrogen per barrel of feed.

The above described catalysts while possessing moderately high initial activity and relatively high mechanical strength have undesirably short active lives and gradually lose their mechanical strength during continued operation and for these reasons must be discarded after relatively short periods of use. It is thought that the decrease in activity and shortness of life of a catalyst are related to a loss in mechanical strength but the reason for this loss and methods for preventing it are not thoroughly understood and are not to be construed as limiting my invention. It has been considered, however, that this loss in mechanical strength is due to the lack of heat stability of the catalyst and may occur during the use of a catalyst either in the catalyzing stage or more probably to greater degree in the regeneration stage of the operation, during which stage the temperatures attained within the catalyst bed are often considerably higher than those used in the catalyzing stage.

The method of testing the heat stability of a catalyst which has been accepted by the industry as a means of predicting the relative catalytic life of a catalyst consists in the calcining of a catalyst at elevated temperatures such as about 1470° F. or higher for a few hours. Many catalysts of the type described above are known to lose mechanical strength and catalytic activity after they have been subjected to such a process. It has been found that this loss in catalytic activity is in close agreement with the loss in mechanical strength and it has also been found that those catalysts which retain their mechanical strength upon calcination at elevated temperatures will also retain their catalytic activity. More important it has been shown that those catalysts which lose mechanical strength and catalyst activity upon calcination at elevated temperatures will have comparatively short catalytic life and will break down in the reactor bed with consequent production of large quantities of fines which are detrimental to the proper functioning of the bed, necessitating too frequent replacement of the catalyst. Conversely, those catalysts which are found to retain their mechanical strength in the calcining test are found not only to have long catalytic life but do not break down into fines during the normal use in the catalytic process. For example, a fresh sample of the commercially prepared catalyst, referred to above, after calcining at 1470° F. becomes very soft and powders easily by rubbing between the fingers and at the same time a relatively large proportion of the activity of this catalyst has been destroyed as shown by its ability to increase the aromatic content of the aforementioned naphtha fraction to only about 17% by volume as compared to an effected increase to 60% by volume when fresh.

My invention relates to an improvement in catalytic compositions for use in the above processes for hydrocarbon conversion and hydrogenating. Specifically, my invention relates to improvement in a carrier composition used in the preparation of catalysts for these processes. I have discovered that the inclusion of relatively small amounts of the compound consisting of an aluminum salt of pentavalent phosphorus in the desired catalyst carrier, such carrier having distended thereon a compound of a metal as listed above and preferably a compound of chromium, molybdenum, or cobalt or combination of such compounds, has the effect of greatly improving the heat stability, thus improving the mechanical strength upon calcination and the active life of the catalyst. I have found this to be particularly true in the case of aluminum ortho phosphate when the aluminum ortho phosphate has been included in the carrier composition consisting primarily of an alumina which has been activated. Compositions containing about 1 to 15% by weight of aluminum ortho phosphate and 85 to 99% by weight of alumina which has been activated have been found to be excellent carriers on which may be distended 1 to 15% by weight or preferably about 11% by weight of molybdenum oxide. Preferably the amount of aluminum ortho phosphate should be about 6%, although it may be decreased to as low as 2% or increased to about 10% without substantially changing the performance of the catalyst. The preferred amount of molybdenum oxide is about 11%. I have found, however, that it may vary within the limits of from about 7% to 13% with good results. Thus, while the final composition of the preferred reforming catalyst will contain about 83% by weight of alumina, 6% by weight of aluminum ortho phosphate and about 11% by weight of molybdenum oxide, catalyst compositions containing about 79 to 93% by weight of alumina, about 2 to 8% by weight of aluminum ortho phosphate and about 5 to 13% by weight of an oxide, such as chromium or molybdenum or the like are excellent catalysts. Moreover, catalysts comprising about 72% to 95% by weight of alumina, about 1% to 15% by weight of aluminum ortho phosphate and about 1% to 15% by weight of an oxide of a metal selected from the left-hand column of the sixth group of the periodic table conform to the compositions indicated above for active heat stable and mechanically strong reforming catalysts and are desirable catalysts conforming to the intent of my invention.

In like manner whereas my preferred catalysts for the hydrogenating of hydrocarbons comprises about 60% by weight of alumina, 6% by weight of aluminum ortho phosphate, and about 34% by weight of cobalt molybdate, catalyst compositions containing from 50 to 85% by weight of alumina, 1% to 15% by weight of aluminum ortho phosphate and from 5% to 45% by weight of cobalt molybdate are excellent catalysts. Moreover, catalysts comprising approximately 50% to 95% by weight of alumina, 1% to 15% by weight of aluminum ortho phosphate and 1% to 49% by weight of an active hydrogenating agent such as the oxides of the metals selected from the fourth series of the eighth group of the periodic table are excellent catalysts for hydrocarbon hydrogenating.

It is also within the spirit of this invention to employ this improved support material as a catalyst without the addition of the aforementioned catalytic agents. In such cases it may be necessary to increase the proportion of the aluminum salt of a pentavalent phosphorus acid on the alumina to values as high as 50% by weight or in certain cases even to values approaching 100% by weight. I have found compositions of this type to be excellent catalysts for the cracking of hydrocarbons. Moreover, it is likewise within the scope of this invention to employ said aluminum salt of a pentavalent phosphorus acid with aluminum salts other than the oxide to produce a superior catalyst for the catalytic treatment of hydrocarbon fractions.

The invention may perhaps be best understood by reference to the following example which should be considered as being only illustrative of the invention and is not to be taken as in any way limiting my invention:

EXAMPLE 1

A catalyst composed of alumina, aluminum ortho phosphate and molybdenum oxide was prepared as follows:

A quantity of 5125 grams of commercial H-80 grade Alcoa alumina gel of the following composition:

| Constituent | Weight, per cent |
| --- | --- |
| Aluminum hydroxide (Al(OH)₃ equivalent) | 16.0 |
| Total sodium (as Na₂O) | 0.1 |
| Sulfates as SO₃ | 0.015 |
| Organic matter | Nil |
| Water | Balance | which exhibited a pH of 10 and a specific gravity of 1.05 was added to five liters of distilled water in a stainless steel vessel. After thorough mixing, the pH was determined and found to be 10.3. One hundred and twenty-six grams of Bakers C. P. aluminum nitrate (Al(NO₃)₃.9H₂O) was dissolved in one liter of distilled water and added to the stirred gel suspension, the resulting mixture having a pH of 4.3. To this mixture was added a solution of 45 grams of Baker's C. P. mono-hydrogen ammonium ortho phosphate in one liter of distilled water. The suspension was agitated for 30 minutes and allowed to stand undisturbed thereafter for 48 hours. The mixture was then filtered and the cake washed twice by resuspension in 10 liters of distilled water and finally washed on the filter with 2 liters of distilled water. The gel cake was then cut into cubes approximately 1 inch square and dried in air at 100–120° C. for 30 hours and at 160° C. for 48 hours and was lastly calcined for two hours at 500° C. and crushed and screened to 4–8 mesh granules.

Two hundred and six grams of the aforesaid support was immersed in a solution of the following composition:

| | Grams |
| --- | --- |
| Distilled water | 201 |
| Baker's C. P. Ammonium Molybdate (82.5% MoO₃) | 47 |
| Baker's C. P. concentrated ammonium hydroxide (28.5% NH₃) | 16 | and agitated therein for a period of approximately 4 minutes. This material was then filtered with suction and the impregnated gel was then dried at 100–120° C. for 36 hours and subsequently at 600° C. for two hours. This completed catalyst hereinafter referred to as catalyst No. 1 showed on analysis a composition of approximately 82.92 weight percent alumina, 6.75 weight percent aluminum ortho phosphate, and approximately 10.33 weight percent molybdenum oxide.

Another catalyst sample hereinafter referred to as catalyst No. 2 was prepared in the same manner as catalyst No. 1 above, using the same steps and procedures without adding the aluminum nitrate and mono-hydrogen ammonium ortho phosphate, giving a catalyst preparation composed of about 90.5 weight percent alumina and about 9.5 percent by weight of molybdenum oxide.

Portions of these catalysts as completed, and after calcining in air at about 1472° F. for 6 hours, were then used in aromatizing a petroleum naphtha boiling in the range of about 200° F. to 280° F. and containing about 14.3% by volume of aromatics. The conditions used in the aromatization operations were the same in every case and were about the following: Liquid hourly space velocity, 1; isothermal block temperature, 950° F. 100 pounds per square inch gauge pressure; 3000 cubic feet of added hydrogen per barrel of feed; and a 4 hour process period.

The difference in the activity and heat stability of these two catalysts, brought about by the presence in catalyst No. 1 of 6.75 weight percent aluminum ortho phosphate, can best be appreciated by reference to the brief tabulation of the data obtained from the above described operations:

Table 1

| Catalyst No. | 1 | 1 | 2 | 2 |
| --- | --- | --- | --- | --- |
| Calcination temperature, ° F | Fresh | 1,472 | Fresh | 1,472 |
| Liq. recovery, vol. per cent of feed | 76.2 | 77.0 | 77.2 | 82.8 |
| Aromatics, vol. per cent of feed | 46.2 | 48.2 | 42.9 | 43.0 |
| Synthetic aromatics vol. per cent of feed | 31.9 | 34.0 | 28.6 | 28.7 |

It is seen from these data that a decided improvement in initial activity as well as in activity of the calcined catalysts is brought about by the presence of aluminum ortho phosphate in catalyst No. 1.

EXAMPLE 2

A carrier composed of an alumina gel containing 1.2% aluminum ortho phosphate was prepared by the precipitation of aluminum ortho phosphate in the presence of a hydrous suspension of alumina gel, said precipitation being accomplished by the addition of the desired quantity of ammonium mono-hydrogen ortho phosphate to an aluminum nitrate solution in the presence of the hydrous aluminum oxide. The resultant mixture was filtered and the cake was ignited in air for two hours at 500° C. to convert it into a hard, highly adsorptive gel of the above composition. This product, crushed and screened to 8 to 20 mesh, was then impregnated with a solution of chromium salt as follows: To 400 grams of the ignited carrier was added 33 grams of ammonium dichromate ((NH₄)₂Cr₂O₇) dissolved in 300 ml. of distilled water, and this mixture was heated to dryness with agitation, dried and ignited as above to obtain a finished catalyst containing about 5% by weight of Cr₂O₃, 1.1% by weight of aluminum ortho phosphate and the remainder alumina.

The above catalyst hereinafter referred to as catalyst No. 3 was employed to dehydrogenate butane in the following operation: Gaseous n-butane was preheated and passed at a rate of 5 liters per hour through 5 ml. of catalyst in a reaction chamber at a temperature of about 565° C., (1050° F.), and substantially atmospheric pressure. This feed rate corresponds to a space velocity (volumes of gaseous feed, measured at 0° C. and 760 mm. of pressure, per volume of catalyst per hour) of 912. Under these conditions employing catalyst No. 3 the average conversion of butane to butenes over a 2-hour reaction period was 32.1% (mol. %). Substantially the same conversions were obtained after regeneration of the above catalyst.

Employing the heat stability test as described above, a sample of this catalyst was calcined at 850° C. (1562° F.) for six hours in air. At the end of this time its physical characteristics and catalytic activity were again determined. Usually, it is found that catalysts supported on alumina lose their hardness, become soft and powdery and lose most of their catalytic activity. This is true, to an appreciable extent, of the above catalyst when the aluminum ortho phosphate is omitted from its composition. With the aluminum ortho phosphate incorporated however, catalyst No. 3 upon calcination at 850° C. retained essentially all of its original form and mechanical strength, and gave a 24% conversion of butane to butenes when tested as above.

EXAMPLE 3

A catalyst for the desulfurization of hydrocarbon stocks was prepared as follows: To 73 pounds of aqueous alumina gel (about 10% $Al_2O_3$) suspended in 40 liters of distilled water was added with constant stirring a solution of 808 grams of Baker's C. P. aluminum nitrate $(Al(NO_3)_3 \cdot 9H_2O)$ in 6 liters of distilled water, the resulting mixture having a pH of 4.3. To this mixture was added a solution of 290 grams of Baker's C. P. monohydrogen ammonium ortho-phosphate in 6 liters of distilled water. The solution was agitated for 30 minutes and allowed to stand overnight. To this suspension of alumina and aluminum ortho phosphate was added a solution of 2350 grams of Baker's C. P. cobalt nitrate $(Co(NO_3)_2 \cdot 6H_2O)$ in 10 liters of distilled water. This addition was made slowly over a period of approximately 2 hours accompanied by vigorous agitation of the suspension. A solution was prepared comprising 1425 grams of Baker's C. P. ammonium molybdate $((NH_4)_6Mo_7O_{24} \cdot 4H_2O)$ dissolved in 10 liters of distilled water containing 1.06 liters of 28.5% $NH_3$ solution. This ammonium molybdate solution was added to the above mixture over a period of 2 hours, constant agitation being maintained throughout the addition. After continued stirring for 2 hours the suspension of completed catalyst had a pH of 7.4. The material was filtered and water-washed three times by resuspension in 40 liters of distilled water, cut into 1 inch cubes and dried at 100° C. for four days. After drying at 190° C. for 24 hours and at 600° C. for 2 hours a hard, adsorbent, gel type solid resulted which will hereinafter be referred to as catalyst No. 4 and which had approximately the following composition:

| Component | Weight, Per cent |
|---|---|
| Alumina | 61.5 |
| Aluminum ortho phosphate | 3.5 |
| Cobalt molybdate | 35.0 |

Another desulfurization catalyst hereinafter referred to as catalyst No. 5 was prepared in the same manner without the addition of aluminum ortho phosphate and had approximately the following composition:

| Component | Weight, Per cent |
|---|---|
| Alumina | 65.0 |
| Cobalt molybdate | 35.0 |

Catalysts No. 4 and No. 5 were then used when fresh and after calcination at 800° C. (1472° F.) for desulfurizing a Santa Maria pressure distillate boiling in the range of 100–400° F. and containing approximately 3.5% by weight of sulfur. Operating conditions for these four runs were the same in every case and were about the following: Liquid hourly space velocity, 1; isothermal block temperature, 700° F.; 250 pounds per square inch gauge pressure, 3000 cubic feet of added hydrogen per barrel of feed; and a 12 hour process period.

Pertinent data from these runs are tabulated in Table 2 below:

Table 2

| Catalyst | 4 | | 5 | |
|---|---|---|---|---|
| Calcination Temp., °C. | Fresh | 800° C. | Fresh | 800° C. |
| Sulfur in feed, wt. per cent. | 3.5 | 3.5 | 3.5 | 3.5 |
| Sulfur in product, wt. per cent. | 0.005–0.01 | 0.01–0.02 | 0.005–0.01 | 0.04–0.05 |

It is apparent from these data that whereas the initial activities of the fresh catalysts are essentially the same, the activity of the calcined catalyst No. 4 is considerably higher than that of the calcined catalyst No. 5 due to the presence therein of 3.5 weight percent aluminum ortho phosphate. It would be reasonable to presume, therefore, based on heat stability of these materials that catalyst No. 4 containing aluminum ortho phosphate would give a longer effective catalyst life than catalyst No. 5 which does not contain the aluminum ortho phosphate.

While the catalysts described in the above examples are of the aromatizing, dehydrogenating, and desulfurizing type and are composed of alumina and a catalytic agent as the catalyst and aluminum ortho-phosphate as the stabilizer, it is within the spirit of the invention to use aluminum ortho-phosphate as the stabilizer for other aromatizing or reforming catalysts and also in catalysts employed in hydrogenating processes other than desulfurization, such as hydrogenation. I prefer to employ those reforming catalysts which use as carriers such solid adsorbent materials as alumina, magnesia and the like and upon which are distended the oxides of the metals of the left-hand column of the sixth group of the periodic table. In like manner, I prefer to employ those hydrogenating catalysts which use as supports such solid adsorbent materials as alumina, magnesia and the like and upon which distended the oxides of the metals of the fourth series of the eighth group of the periodic table or the combined oxides of the metals of the fourth series of the eights group of the periodic table with the metals of the left-hand column of the sixth group of the periodic table.

Moreover, the aromatization operations described in the above examples are only illustrative of the possible uses of catalysts stabilized by the addition thereto of an aluminum salt of pentavalent phosphorus and it is within the scope of the invention to use any or all of the above types of catalysts in carrying out the conversion processes defined as dehydrogenation, cracking, aromatization and the like as well as the hydrogenating processes such as desulfurization, hydrogenation and the like.

Any or all of the above-named processes for the conversion of hydrocarbons may be carried out at temperatures in the range of about 700° F. to about 1300° F. and under gauge pressures of about −14.5 pounds up to about 1000 pounds per square inch using catalysts having the compositions disclosed above.

In like manner any or all of the above-named processes for the hydrogenating of hydrocarbons may be carried out at temperatures in the range of about 400° F. to about 1000° F. and under gauge pressures of about atmospheric to about 1000 pounds per square inch using catalysts having the compositions described above.

The foregoing description of my invention is not to be considered as limiting since many variations may occur to those skilled in the art without departing from the scope of the claims or the spirit thereof.

I claim:

1. A process for the catalytic treatment of hydrocarbons which comprises subjecting such hydrocarbons to a temperature between about 400° F. and 1300 F. under a gage pressure between about −14 pounds and 1000 pounds per square inch in the presence of a catalyst consisting essentially of a major proportion of a stabilized carrier and a minor proportion of a catalytic agent distended thereon, said stabilized carrier consisting essentially of alumina which has been activated and which has been stabilized by the addition thereto of between about 1% and 15% of aluminum phosphate, and said catalytic agent being selected from the class consisting of metal oxides and combinations of metal oxides.

2. A process according to claim 1 in which the aluminum phosphate is aluminum orthophosphate.

3. A process according to claim 1 which is carried out in the presence of hydrogen.

4. A process according to claim 1 in which the catalytic agent is molybdenum oxide.

5. A process according to claim 1 in which the catalytic agent is chromium oxide.

6. A process according to claim 1 in which the catalytic agent is cobalt molybdate.

7. A process for catalytic aromatization of hydrocarbons which comprises subjecting such hydrocarbons to a temperature between about 800° F. and about 1200° F. under a gage pressure between about atmospheric and about 1000 pounds per sq. inch in the presence of added hydrogen and a catalyst consisting essentially of a major proportion of a stabilized carrier and a minor proportion of molybdenum oxide distended thereon, said stabilized carrier consisting essentially of precipitated alumina on which has been precipitated between about 1% and 15% of aluminum orthophosphate.

8. A process for the catalytic dehydrogenation of hydrocarbons which comprises subjecting such hydrocarbons to a temperature between about 800° F. and about 1300° F. at a gage pressure between about −14 pounds and about 1000 pounds per sq. in. in the presence of a catalyst consisting essentially of a major proportion of a stabilized carrier and a minor proportion of chromium oxide distended thereon, said stabilized carrier consisting essentially of precipitated aluminum on which has been precipitated between about 1% and 15% of aluminum orthophosphate.

9. A process for the catalytic desulfurization of hydrocarbons which comprises subjecting such hydrocarbons to a temperature between about 500° F. and 1000° F. at a gage pressure between about atmospheric and about 1000 pounds per sq. in. in the presence of added hydrogen and a catalyst consisting essentially of a major proportion of a stabilized carrier and a minor proportion of cobalt molybdate distended thereon, said stabilized carrier consisting essentially of precipitated alumina on which has been precipitated between about 1% and 15% of aluminum orthophosphate.

ROBERT I. STIRTON.

REFERENCES CITED

The following references are of record in the file of this patent:

UNITED STATES PATENTS

| Number | Name | Date |
| --- | --- | --- |
| 1,271,013 | Bosch et al. | July 2, 1918 |
| 1,882,712 | Andrussow et al. | Oct. 18, 1932 |
| 2,325,033 | Byrns | July 27, 1943 |
| 2,330,115 | Drennan | Sept. 21, 1943 |
| 2,349,827 | Wattox | May 30, 1944 |

OTHER REFERENCES

"Activated Alumina Its Properties and Uses," pub. by Aluminum Ore Co., East St. Louis, Illinois (1938), 42 pages, 2 sheets drawing.